(12) United States Patent
Vuillamy et al.

(10) Patent No.: US 11,427,354 B2
(45) Date of Patent: Aug. 30, 2022

(54) TANK FOR A SPACECRAFT ENGINE

(71) Applicant: ARIANEGROUP SAS, Paris (FR)

(72) Inventors: Didier Vuillamy, Quincampoix (FR); Gérard Roz, Pressagny l'Orgueilleux (FR); Emmanuel Edeline, Ecos (FR)

(73) Assignee: ARIANEGROUP SAS, Paris (FR)

( * ) Notice: Subject to any disclaimer, the term of this patent is extended or adjusted under 35 U.S.C. 154(b) by 300 days.

(21) Appl. No.: 16/625,350

(22) PCT Filed: Jun. 21, 2018

(86) PCT No.: PCT/FR2018/051505
§ 371 (c)(1),
(2) Date: Dec. 20, 2019

(87) PCT Pub. No.: WO2018/234705
PCT Pub. Date: Dec. 27, 2018

(65) Prior Publication Data
US 2021/0403180 A1    Dec. 30, 2021

(30) Foreign Application Priority Data
Jun. 22, 2017 (FR) ...................................... 1755704

(51) Int. Cl.
*B64G 1/40* (2006.01)
*F17C 13/04* (2006.01)

(52) U.S. Cl.
CPC ............. *B64G 1/402* (2013.01); *B64G 1/401* (2013.01); *F17C 13/04* (2013.01);
(Continued)

(58) Field of Classification Search
CPC ......... B64G 1/402; B64G 1/401; F17C 13/04; F17C 2201/0109; F17C 2201/0166;
(Continued)

(56) References Cited

U.S. PATENT DOCUMENTS 3,121,392 A * 2/1964 Economon ............. B64G 1/007
102/381
3,321,159 A * 5/1967 Jackson ................ F17C 13/001
244/135 R
(Continued)

FOREIGN PATENT DOCUMENTS

DE     2249081 B1    11/1973
EP     0434509 A1    6/1991
(Continued)

OTHER PUBLICATIONS

Japanese Office Action in corresponding Japanese Application No. 2019-570996, dated Jun. 14, 2022 (3 pages).
(Continued)

*Primary Examiner* — Shawn M Braden
(74) *Attorney, Agent, or Firm* — Bookoff McAndrews, PLLC

(57) ABSTRACT

Cryogenic propellant tank (1) for a spacecraft engine, comprising an external enclosure (10) defining an internal volume, characterized in that the internal volume of the tank comprises a primary volume (V1) and a secondary volume (V2) connected to the primary volume (V1) via a valve (20) configured to selectively allow a passage of fluid from the primary volume (V1) to the secondary volume (V2), or to isolate the secondary volume (V2) from the primary volume (V1), the primary volume (V1) having a primary orifice (11) adapted to be connected to a first pressurization source (41), the secondary volume (V2) having a supply orifice (4) adapted to be connected to a supply line of a spacecraft engine (30), and a secondary orifice (12) adapted to be connected to a second pressurization source (42).

7 Claims, 2 Drawing Sheets

(52) U.S. Cl.
CPC .......... *F17C 2201/0109* (2013.01); *F17C 2201/0166* (2013.01); *F17C 2201/0171* (2013.01); *F17C 2203/0646* (2013.01); *F17C 2205/0134* (2013.01); *F17C 2221/011* (2013.01); *F17C 2221/012* (2013.01); *F17C 2221/033* (2013.01); *F17C 2223/0161* (2013.01); *F17C 2227/0142* (2013.01); *F17C 2250/03* (2013.01); *F17C 2265/066* (2013.01); *F17C 2270/0194* (2013.01)

(58) Field of Classification Search
CPC ...... F17C 2201/0171; F17C 2203/0646; F17C 2205/0134; F17C 2221/011; F17C 2221/012; F17C 2221/033; F17C 2223/0161; F17C 2227/0142; F17C 2250/03; F17C 2265/066; F17C 2270/0194
USPC .................................................... 220/560.11
See application file for complete search history.

(56) References Cited

U.S. PATENT DOCUMENTS

| | | | | |
|---|---|---|---|---|
| 5,444,973 | A * | 8/1995 | Limerick | B64G 1/401 |
| | | | | 60/204 |
| 9,908,641 | B2 * | 3/2018 | Fontaine | F02K 9/50 |
| 10,495,027 | B1 * | 12/2019 | Hodge | F02C 7/264 |
| 2013/0239544 | A1 | 9/2013 | Sisk | |
| 2014/0203148 | A1 * | 7/2014 | Barthoulot | F02K 9/50 |
| | | | | 244/171.1 |
| 2015/0337763 | A1 * | 11/2015 | Vuillamy | F02K 9/46 |
| | | | | 60/221 |
| 2015/0354503 | A1 * | 12/2015 | Vuillamy | F02K 9/60 |
| | | | | 60/217 |
| 2016/0169159 | A1 * | 6/2016 | Roz | F02K 9/50 |
| | | | | 60/726 |
| 2016/0237951 | A1 * | 8/2016 | Sannino | F02K 9/46 |
| 2018/0058378 | A1 * | 3/2018 | Roz | F02K 9/46 |
| 2021/0388947 | A1 * | 12/2021 | Yoshida | F17C 13/025 |

FOREIGN PATENT DOCUMENTS

| | | | |
|---|---|---|---|
| FR | 2635499 | A1 | 2/1990 |
| GB | 2170163 | A | 7/1986 |
| JP | S6065284 | A | 4/1985 |
| JP | H03114997 | A | 5/1991 |
| JP | H04208698 | A | 7/1992 |
| JP | H06206598 | A | 7/1994 |
| JP | H07257497 | A | 10/1995 |
| JP | 2014519578 | A | 8/2014 |
| WO | WO 2006/106204 | | 10/2006 |
| WO | WO 2016/158538 | A1 | 10/2016 |

OTHER PUBLICATIONS

Official Communication dated Oct. 8, 2018, in corresponding PCT Application No. PCT/FR2018/051505 (6 pages).

* cited by examiner

TANK FOR A SPACECRAFT ENGINE

CROSS-REFERENCE TO RELATED APPLICATION(S)

This application is the U.S. national phase entry under 35 U.S.C. § 371 of International Application No. PCT/FR2018/051505, filed on Jun. 21, 2018, which claims priority to French Patent Application No. 1755704, filed on Jun. 22, 2017.

FIELD OF THE INVENTION

The present disclosure concerns the field of liquid propellant launch vehicles and more specifically concerns a tank for rocket engine.

STATE OF THE PRIOR ART

Engines for spacecraft launch vehicles typically consume cryogenic propellant stored in dedicated tanks. These tanks contain a liquid phase i.e. cryogenic propellant, and a gas phase the volume of which increases as and when the cryogenic propellant is consumed.

However, the gas contained in the tanks of cryogenic propellants is commonly held at a temperature higher than that of the cryogenic propellant, typically in the region of 90 K for oxygen, 21 K for hydrogen, 110 K for methane, to ensure good compatibility with the pumps conveying the same towards the engines. This difference in temperature between the gas phase and liquid phase in the tanks means that at the gas/liquid interface the temperature of the cryogenic propellant undergoes a substantial increase, rising by several degrees.

It has been ascertained that these heated propellants do not allow proper functioning of the pumps which feed the engines, and cause a cavitation phenomenon. To prevent this phenomenon, it is necessary significantly to increase the pressure within the tank so that the propellant is conveyed towards the pump at a higher pressure, which entails additional restrictions with regard to the structure of the tank notably in terms of mass, which are unacceptable. The solution routinely chosen is therefore not to consume part of the propellant contained in each tank, substantially corresponding to that portion of the propellant having the highest temperature on account of its contact with the gas contained in the tank under consideration. It will easily be understood that said solution leads to loss of propellant, and additionally to a needless increase in the mass of the launch vehicle through this unused propellant.

DESCRIPTION OF THE INVENTION

The present disclosure therefore concerns a cryogenic propellant tank for spacecraft engine, comprising an outer enclosure defining an inner volume,
characterized in that the inner volume of the tank comprises a primary volume and a secondary volume connected to the primary volume by a valve configured to selectively allow the passing of fluid from the primary volume towards the secondary volume, or to isolate the secondary volume from the primary volume,
the primary volume having a primary orifice adapted to be connected to a first pressurization source,
the secondary volume having a supply orifice adapted to be connected to a supply line of a spacecraft engine, and a secondary orifice adapted to be connected to a second pressurization source.

In one example, the tank further comprises an inner wall arranged inside the outer enclosure, said inner wall separating the inner volume of the outer enclosure so as to define the primary volume and the secondary volume.

The outer enclosure and inner wall of the auxiliary tank are then typically made of aluminium and assembled by welding, or in a composite material.

In one example, the outer enclosure has a hatch to access the inner volume, positioned to enable a user to access the valve.

The present disclosure also concerns a stage of a spacecraft launch vehicle comprising a liquid propellant engine connected to at least one tank such as previously defined, wherein the primary volume and secondary volume are arranged so as to be superimposed in a longitudinal direction corresponding to a direction of travel of the spacecraft launch vehicle, the primary volume being configured so as to be arranged above the secondary volume in relation to a determined direction of travel in the longitudinal direction.

In one example, the first pressurization source is coupled to an attitude controller, configured to control pressurization within the primary volume and to make use of the gas in the primary volume for attitude control.

In one example, the second pressurization source is configured so as to selectively pressurize the secondary volume for conveying of the propellant contained in the secondary volume towards the engine through the engine supply line.

BRIEF DESCRIPTION OF THE DRAWINGS

The invention and its advantages will be better understood on reading the detailed description below of different embodiments of the invention given as nonlimiting examples. This description refers to the appended pages of Figures in which.

In both Figures, same elements carry the same reference numbers.

DETAILED DESCRIPTION OF EXAMPLES OF EMBODIMENT

Figure 1:
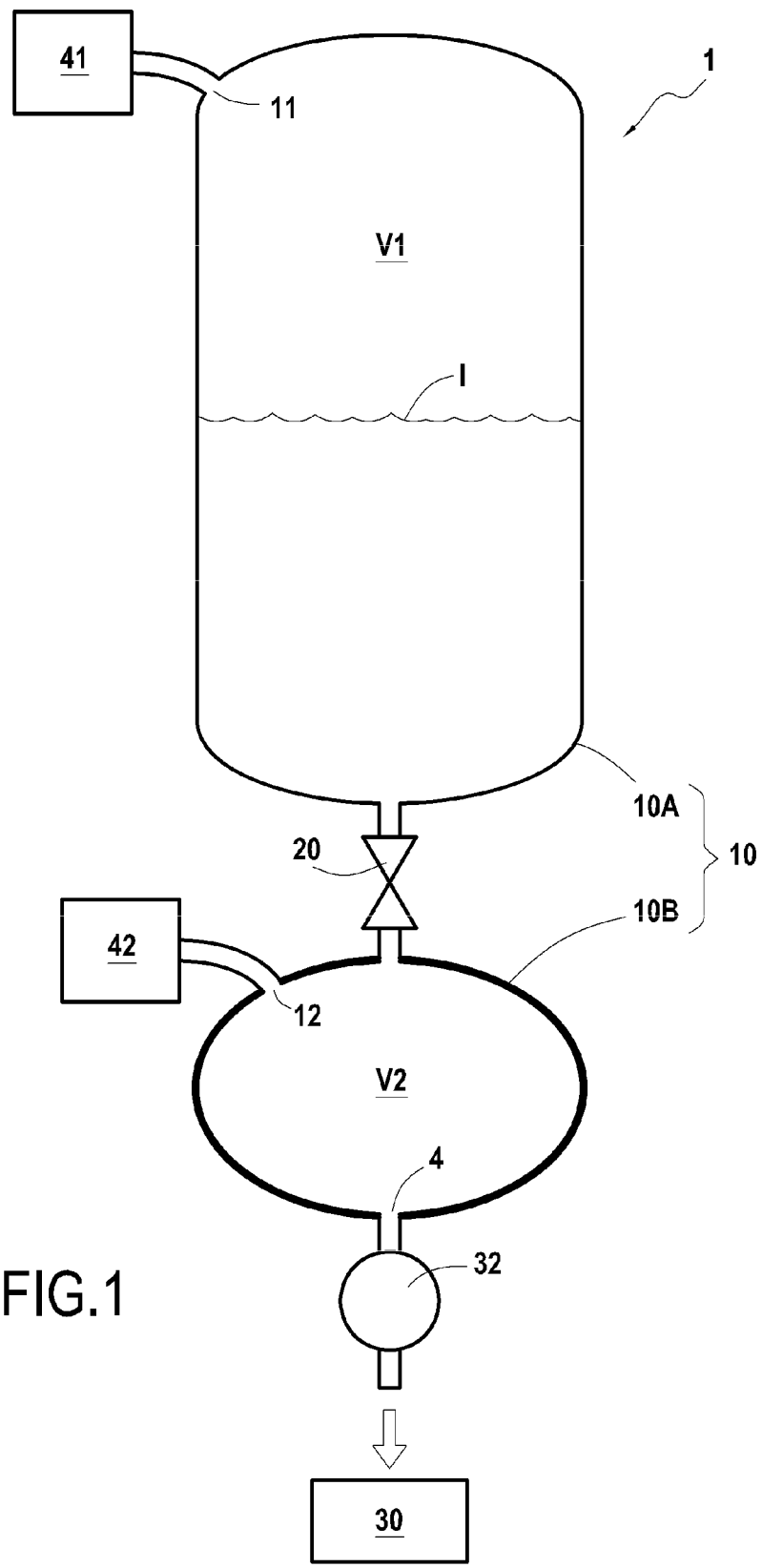
FIG. 1: schematically illustrates a spacecraft tank 1 for cryogenic propellant, in one aspect of the invention.
Figure 2:
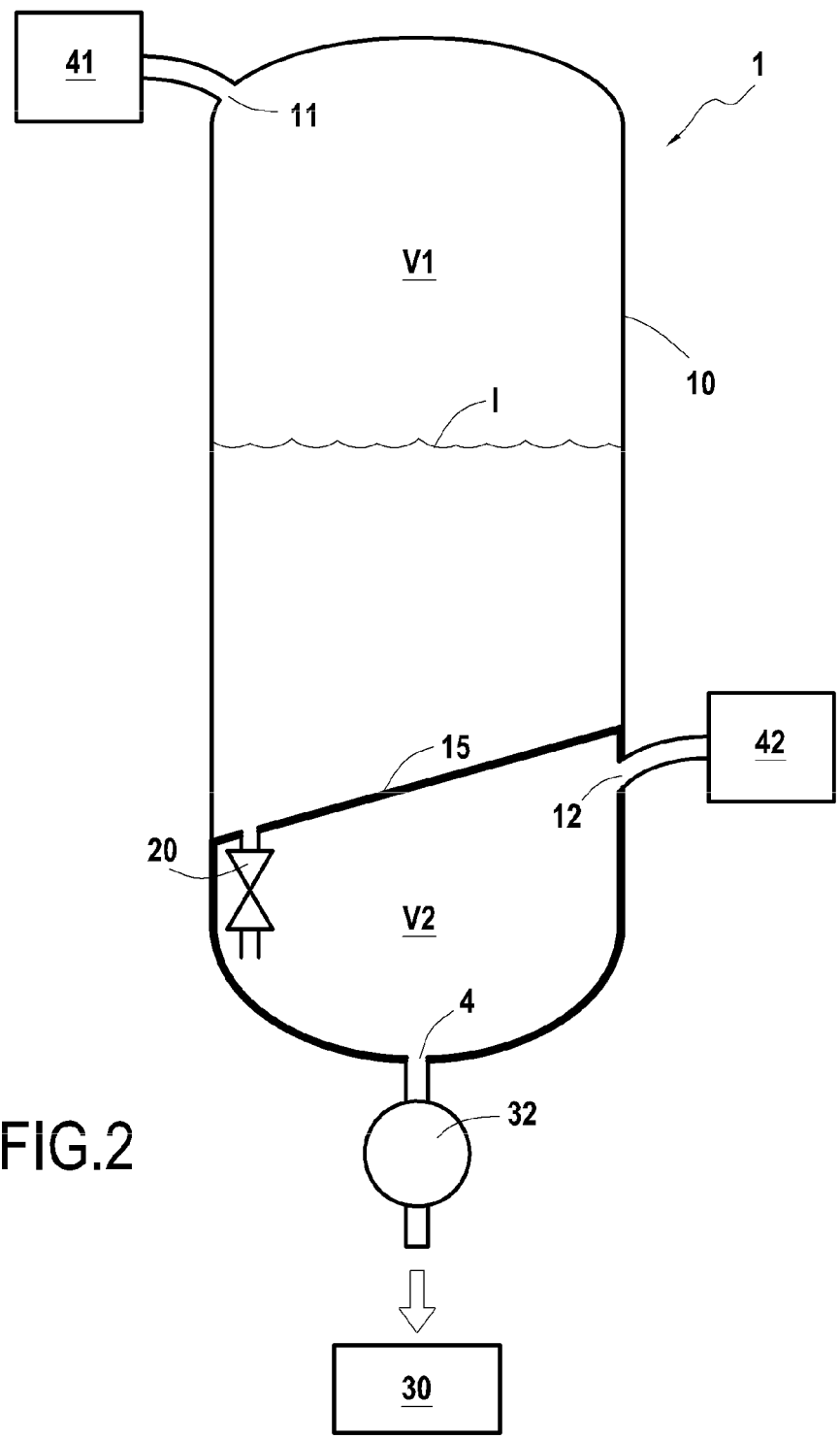
FIG. 2 illustrates one variant of the tank 1 depicted in FIG. 1.

FIG. 1 schematically illustrates a spacecraft tank 1 for cryogenic propellant according to one aspect of the invention. FIG. 2 shows a variant of the tank 1 illustrated in FIG. 1.

The tank 1 such as illustrated comprises an outer enclosure 10 defining an inner volume of the tank 1. This inner volume of the tank 1 is divided into two volumes: a primary volume V1 and a secondary volume V2.

In the embodiment illustrated in FIG. 1, the outer enclosure 10 of the tank 1 is in two parts 10A and 10B respectively defining the primary volume V1 and secondary volume V2. The relative arrangement of the two parts 10A and 10B of the outer enclosure 10 of the tank 1 is given by way of example: several configurations can be envisaged to assemble the two parts of the tank in series.

In the embodiment illustrated in FIG. 2, an inner wall 15 divides the inner volume defined by the outer enclosure 10 into two subvolumes thereby defining the primary volume V1 and the secondary volume V2.

These two embodiments have similar functioning as described below.

The tank 1 is adapted to contain cryogenic propellant intended to feed a spacecraft engine. The primary volume V1 is connected to the secondary volume V2 by a valve 20 configured to selectively allow the passing of fluid from the primary volume V1 towards the secondary volume V2, or to isolate these two volumes V1 and V2 from each other. The valve 20 is typically a rotary valve with cylindrical gate and is typically sized to ensure sealing against a pressure differential of approximately 3 bar to 50 bar.

The tank 1 comprises a supply orifice 4 intended to be connected to a propellant supply line of an engine 30, typically by a pump or turbopump 32. The supply orifice typically leads into the secondary volume V2 of the tank 1. The primary volume Vi and the secondary volume V2 are each connected to a pressurization source which may be the same or different. The tank 1 therefore has a primary orifice 11 opening into the primary volume V1 and a secondary orifice 12 opening into the secondary volume V2, these orifices being connected to a first pressurization source 41 and second pressurization source 42 respectively. For example, the first pressurization source 41 and second pressurization source 42 can be accumulators, pumps or any other means adapted to obtain pressurization of a gas phase in a tank.

In operation, the cryogenic propellant is initially stored in the primary volume V1 and in the secondary volume V2. To supply the engine 30 with propellant, the valve 20 is open to allow circulation of the propellant from the primary volume V1 towards the secondary volume V2. The propellant is drawn from the second volume V2, and the propellant contained in the primary volume V1 flows into the secondary volume V2 to maintain filling. A gaseous headspace is therefore formed in the primary volume V1 as and when the propellant is consumed. The first pressurization source 41 maintains adapted pressure in the gaseous headspace of the primary volume 41, typically of approximately 4 to 5 bar, to ensure conveying of propellant towards the pump 32 and towards the engine 30.

Once all the propellant contained in the primary volume V1 is consumed, the primary volume V1 is therefore filled with gas. The valve 20 then switches to closed position to isolate the primary volume V1 from the secondary volume V2.

The primary volume 1 can then be used for example for attitude control. It can become a pressurization source able to be used in the manner of the first pressurization source 41 and in conjunction with the latter so that together they can feed an attitude controller of the associated launch vehicle.

The secondary volume V2 of the tank 1 continues to supply the engine 30 with propellant. It will be understood that one portion of the cryogenic propellant lying at the interface with the gas contained in the tank 1 has a substantially higher temperature since the gas contained in the tank 1 is typically held at a temperature in the region of 300 K whilst cryogenic propellants are typically held at a temperature in the region of 90 K, 21 K or 110 K depending on propellant (for oxygen, hydrogen or methane respectively). Therefore, the temperature of the cryogenic propellant at the gas/liquid interface undergoes a substantial increase, increasing by a few degrees. This portion of the propellant is generally called «thermal propellant». In FIGS. 1 and 2, the gas-liquid interface is arbitrarily shown by a line I within the primary volume V1 of the tank 1.

To enable use of this thermal propellant, the second pressurization source 42 is configured to increase the pressure substantially within the secondary volume V2 so that the pump or turbopump 32 can be supplied with this thermal propellant whilst preventing the onset of a cavitation phenomenon. For example, the pressure of the gas in the secondary volume V2 can be increased by 3 to 4 bar up to 8 to 10 bar, which will prevent cavitation of the pump or turbopump 32 when supplied with propellant having a substantially higher temperature than the nominal value.

This rise in pressure in the secondary volume V2 can be triggered for example when the volume of propellant reaches a predetermined level within the secondary volume V2, and/or the temperature of the propellant at the inlet to the pump or turbopump 32 exceeds a threshold temperature value. The tank 1 can therefore be equipped with a level probe to measure the level of propellant in the secondary volume V2, and the supply orifice 4 can be equipped with a temperature probe to measure the temperature of the propellant leaving the secondary volume V2 of the tank 1.

It will be understood on reading the foregoing that the rise in pressure to prevent cavitation of the pump or turbopump 32 is solely obtained in the secondary volume V2 of the tank 1. Therefore, the tank 1 such as proposed allows use to be made of all the propellant contained in the tank 1 whilst minimizing structural impact due to the rise in pressure required to make use of thermal propellant, since solely one part of the tank 1 corresponding to the secondary volume V2 needs to be structured to withstand higher pressures. The secondary volume V2 is typically reduced in relation to the primary volume V1, for example by between V1/5 and 4×V1/5, or between V1/3 and 2×V1/3.

The tank is typically made of aluminium or a composite material. The inner wall of the tank is typically made of the same material as the tank, and therefore in this case it is in aluminium or a composite material.

The outer enclosure 10 of the tank 1 typically has an access hatch to the inner volume of the tank 1, to provide access to the valve 20 and allow replacement or repair thereof if required. The valve 20 is therefore advantageously arranged close to the outer wall 10 of the tank 1 to facilitate access thereto.

The tank 1 such as presented can find particular application for the stage of a spacecraft launch vehicle, to feed a liquid-propellant engine of said launch vehicle with propellant.

Having regard to the direction in which the launch vehicle is intended to travel, the primary volume V1 and secondary volume V2 of the tank 1 are superimposed in this direction, so that the primary volume V1 lies above the secondary volume V2. Said arrangement facilitates flow of liquid propellant from the primary volume V1 towards the secondary volume V2.

The invention claimed is:

1. A cryogenic propellant tank for a spacecraft engine, comprising an outer enclosure defining an inner volume,
characterized in that the inner volume of the tank includes
a primary volume and a secondary volume connected to the primary volume by a valve configured to selectively (i) allow passing of fluid from the primary volume towards the secondary volume, or (ii) isolate the secondary volume from the primary volume,
the primary volume having a primary orifice configured to be connected to a first pressurization source,
the secondary volume having a supply orifice configured to be connected to a supply line of a spacecraft engine, and a secondary orifice configured to be connected to a second pressurization source, and
the cryogenic propellant tank further comprising an inner wall arranged inside the outer enclosure, said inner wall separating the inner volume of the outer enclosure so as to define the primary volume and the secondary volume.

2. The tank according to claim 1, wherein the outer enclosure and the inner wall of the tank are made of aluminium and assembled by welding.

3. The tank according to claim 1, wherein the outer enclosure and the inner wall of the tank are made of composite material.

4. The tank according to claim 1, wherein the outer enclosure has a hatch configured to provide access to the inner volume, positioned to enable a user to access the valve.

5. A stage of a spacecraft launch vehicle comprising a liquid propellant engine connected to at least one tank according to claim 1, wherein the primary volume and secondary volume are arranged so as to be superimposed in a longitudinal direction corresponding to a direction of travel of the spacecraft launch vehicle, the primary volume being configured so as to be arranged above the secondary volume in relation to a determined direction of travel in the longitudinal direction.

6. The stage of a spacecraft launch vehicle according to claim 5, wherein the first pressurization source is coupled to an attitude controller, configured to control pressurization within the primary volume and to make use of the fluid in the primary volume for attitude control.

7. The stage of a spacecraft launch vehicle according to claim 5, wherein the second pressurization source is configured so as to selectively pressurize the secondary volume in order to convey the fluid contained in the secondary volume towards the engine through a supply line.

\* \* \* \* \*